No. 861,076. PATENTED JULY 23, 1907.
A. E. BAUM, A. SCHOEL & C. E. EDWARDS.
DOUGHNUT CUTTER.
APPLICATION FILED SEPT. 22, 1906.
3 SHEETS—SHEET 2.
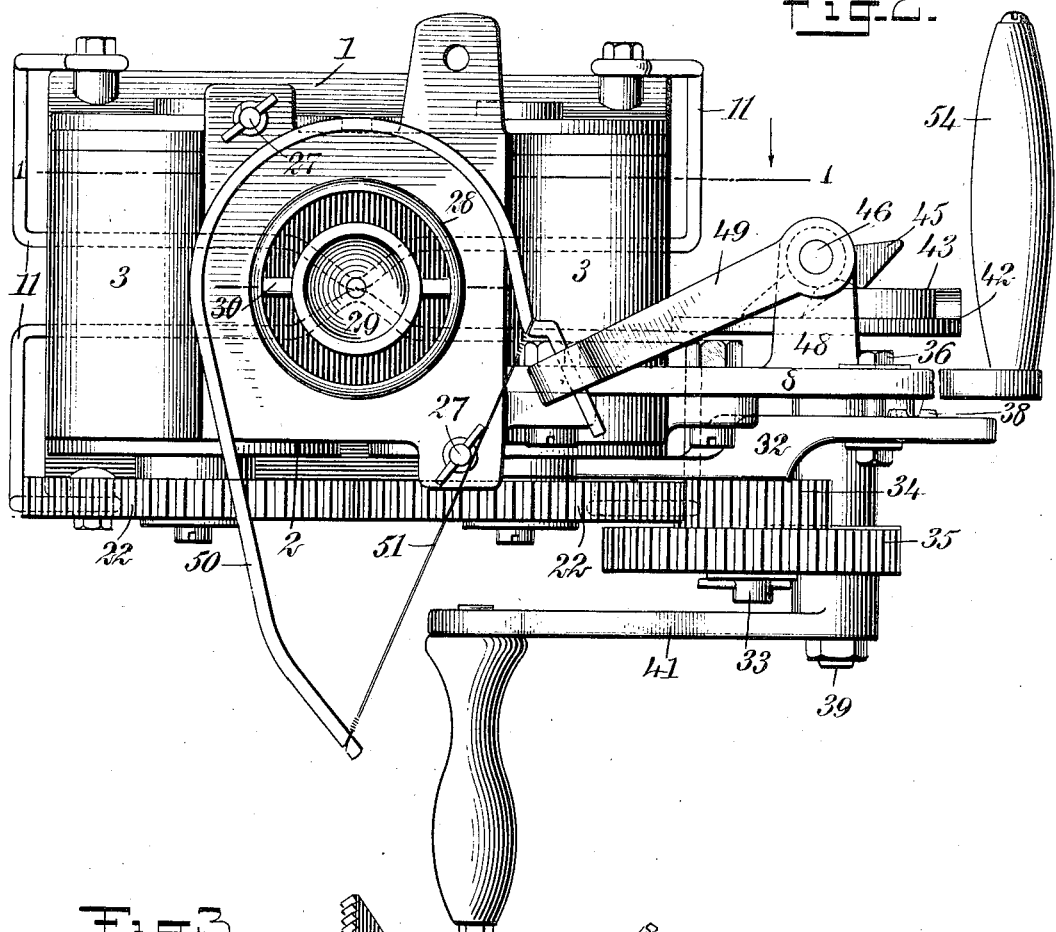
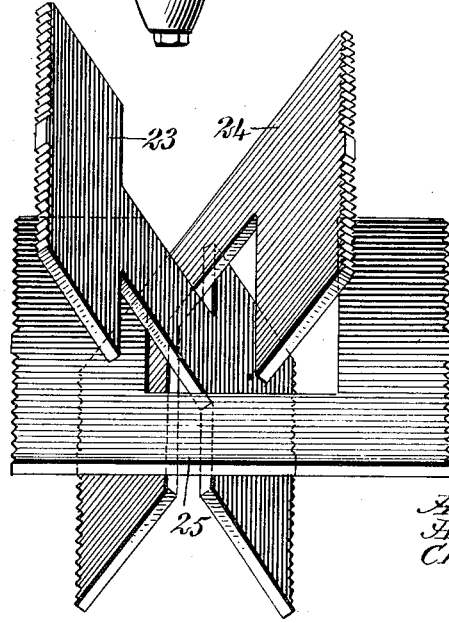
WITNESSES
INVENTORS
Albert E. Baum
August Schoel
Charles E. Edwards
BY
ATTORNEYS

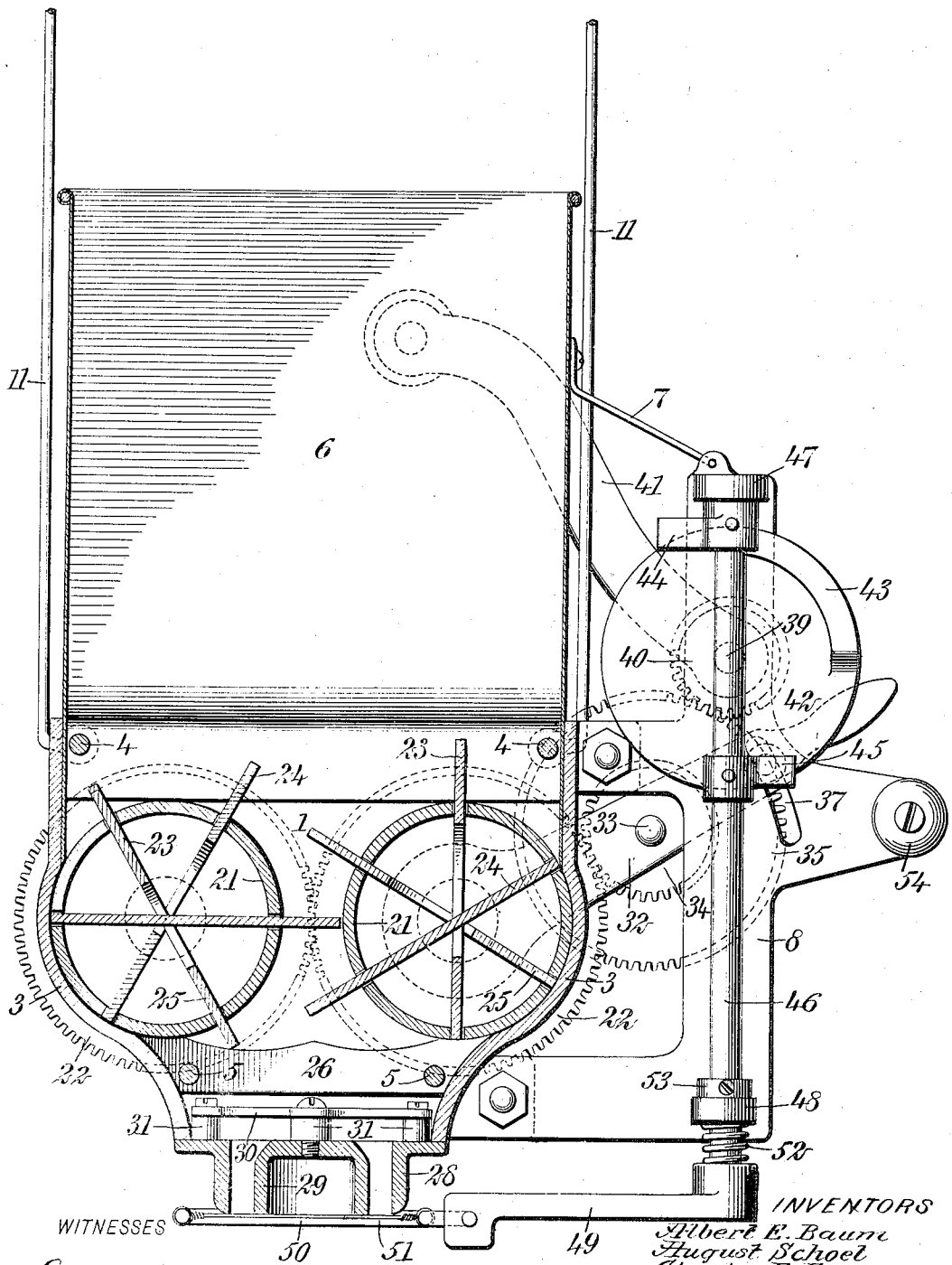

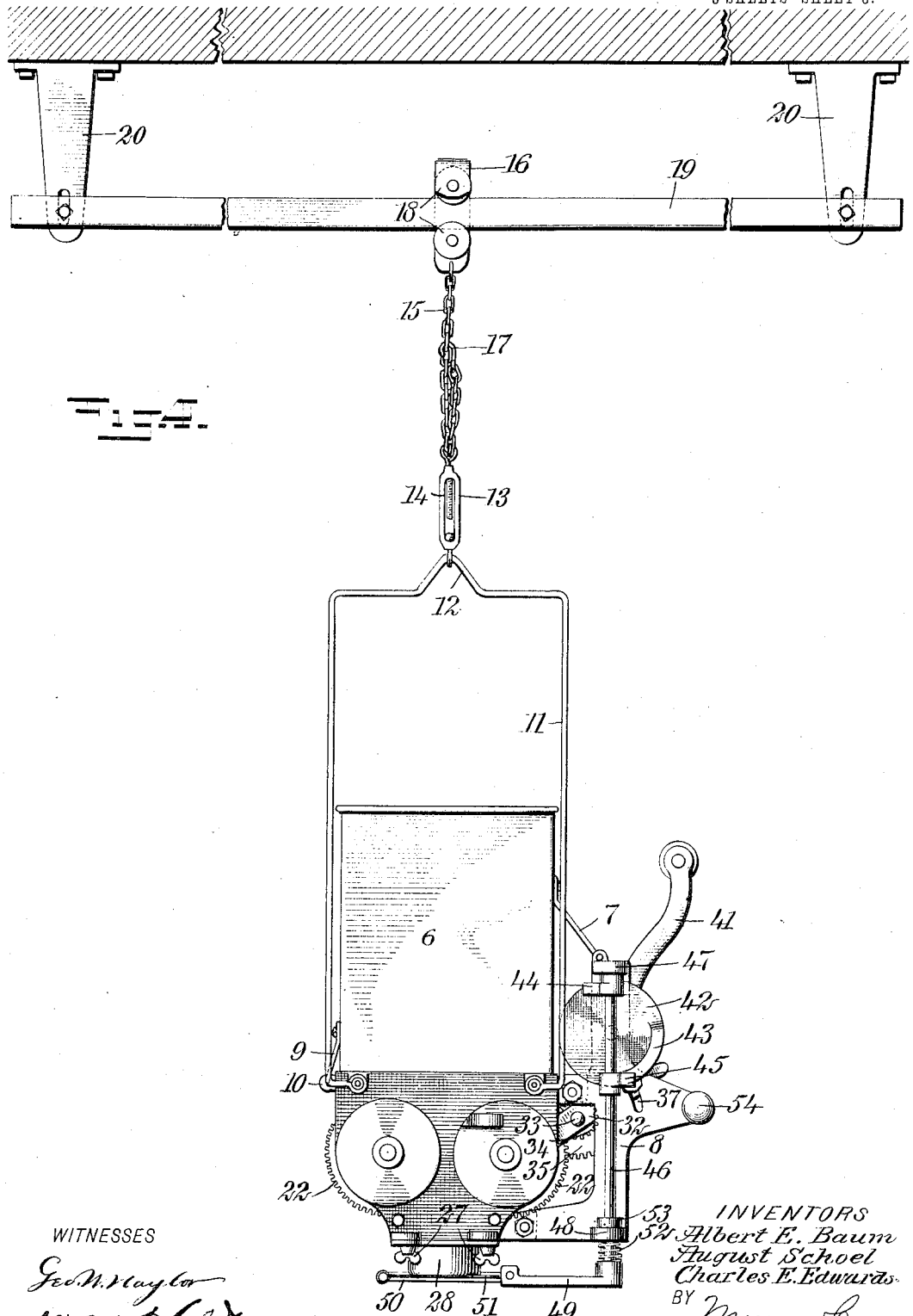

UNITED STATES PATENT OFFICE.

ALBERT EMMET BAUM, AUGUST SCHOEL, AND CHARLES ED EDWARDS, OF WATERLOO, IOWA.

DOUGHNUT-CUTTER.

No. 861,076.          Specification of Letters Patent.          Patented July 23, 1907.

Application filed September 22, 1906. Serial No. 335,715.

*To all whom it may concern:*

Be it known that we, ALBERT EMMET BAUM, AUGUST SCHOEL, and CHARLES ED EDWARDS, citizens of the United States, and residents of Waterloo, in the county of Blackhawk and State of Iowa, have invented a new and Improved Doughnut-Cutter, of which the following is a full, clear, and exact description.

This invention is an improved doughnut cutter designed to positively feed dough or the like of varying consistencies and form it rapidly into uniform rings commonly known as doughnuts.

In carrying out the invention special means have been provided for readily shifting the machine from the bowl or other receptacle containing the dough to the kettle containing the hot grease in which the doughnuts are cooked.

Reference is to be had to the accompanying drawings forming a part of this specification, in which similar characters of reference indicate corresponding parts in all the figures.

Figure 1 is a sectional side elevation of the doughnut cutting machine substantially on the line 1—1 of Fig. 2; Fig. 2 is an inverted plan view of the machine complete; Fig. 3 is a perspective view of a set of feed paddles employed in feeding the dough to the doughnut forming means, and Fig. 4 is a side elevation of the machine showing it suspended from a rail adapting the machine to be easily shifted from the receptacle containing the dough to the cooking vessel.

The invention comprises a feed-box consisting of sides 1 and 2 and ends 3, the side 2 and ends 3 being preferably cast as an integral part and the side 1 being removably secured thereto by transverse bolts 4 and 5. Into the upper end of the feed-box projects a feed-chute or hopper 6 which is held in place by a hook 7 engaging the upper end of a bracket 8 fixed to lugs projecting from one of the ends 3. The chute is fastened to the feed-box at the opposite side by a hook 9 engaging an apertured lug 10 projecting from the adjacent end 3. The bolts 4 for attaching the side 1 also pass through handle members 11 preferably constructed of wire and provided with a kink 12 in their upper, central portions which are engaged by a hook at one end of a turn-buckle 13. An eye-bolt 14 is threaded into the opposite end of the turn-buckle and is connected to a chain 15 depending from a block 16, said connection being made by passing the chain through the eye of the bolt and engaging it with any of the links of the chain by a hook 17, thus providing for the adjustment of the machine to any required elevation. The block 16 has journaled therein two grooved wheels 18 engaging the opposite edges of a rail or track 19, the latter being suspended from the ceiling by brackets 20 slotted at their lower extremities in order that the track might be capable of slight adjustment.

Journaled in the sides 1 and 2 of the feed-box adjacent to the ends 3, are drums 21 slightly spaced apart and having their axes prolonged at the side 2, to which are fixed intermeshing gears 22. As best shown in Fig. 1, the ends 3 of the feed-box are reversely curved, conforming closely to the periphery of the drums for a distance, and converging toward each other, providing the feed box with a contracted, lower, open end. In each of the drums are slidably mounted a set of paddles 23, 24 and 25 best shown in perspective in Fig. 3, the paddle 23 being cut out at each side, making it substantially I-shaped, whereas the paddles 24 and 25 are identical in construction and made substantially in the form of a "C", each fitting in a cut-out portion of the paddle 23. These paddles are serrated on their ends and are arranged diametrically of the drums and loosely pass through slots therein.

The bolts 5 pass through a cam-plate 26, which is centrally fixed in the feed-box and acts to reciprocate the paddles as the drums revolve. Attached to the contracted, lower, open end of the feed-box, as by thumb-screws 27, is a cylinder 28 concentrically surrounding a die member 29 which is attached to the cylinder from which it is supported, by a crossbar 30, the latter being held in separated relation by spacing blocks 31. As shown in Fig. 1, the upper end of the die member 29 is slightly conical to easily admit the dough between it and the cylinder 28.

Journaled near one end on one of the axes of one of the drums 21 adjacent to the gear 22 is an arm 32 carrying a projecting stud 33 intermediate its length, on which is journaled a large and a small gear 34 and 35 respectively, the gear 34 being in mesh with the adjacent gear 22. The gears 34 and 35 are fixed together by any suitable means, and the arm which carries them is held in adjusted position by a bolt 36 passing through it and through a slot 37 in the bracket 8. As a further precaution to hold the arm 32 in adjusted position, it is provided with a tooth 38 engaging in one of a series of teeth projecting from one side of the bracket 8.

Journaled in the upper end of the bracket 8 is a short shaft 39 having a small gear 40 fixed thereto in mesh with the gear 35. A crank 41 is also fixed to this shaft adjacent to the gear and serves to operate the machine. Fixed to the opposite end of the shaft 39 is a cam-disk 42 carrying a projecting cam 43 at one side, adapted to alternately engage projecting arms 44 and 45 fixed to a vertical shaft 46, said shaft being journaled in lugs 47 and 48 projecting from one side of the bracket 8. Also fixed to the shaft 46 at its lower extremity is a crank arm 49 adjustably carrying at its outer end a bow 50 connected together by a cutting wire 51. A spring 52 intermediate the lug 48 and the crank-arm 49 normally pulls the shaft 46 downwardly and frictionally engages a stop-collar 53 with the top face of said lug, thereby preventing the bow and cutting wire against accidental displacement. At one side of the bracket 8 is a projecting handle 54 designed to serve as a means for shifting the machine on the track 19 to carry the machine from the bowl containing the dough to the vessel containing the grease in which the doughnuts are cooked. In practice, the track will be slightly elevated at the end over the vessel containing the cooking grease in order that the machine may normally stay adjacent to the bowl in which the dough is placed.

In the operation of the machine, the dough is placed in the hopper 6 and the crank 41 turned, causing the drums 21 to revolve toward each other through the intermediate gearing. As the drums revolve the ends of the paddles are successively engaged by the curved or cam edge of the plate 26, acting to push the paddles upwardly through the drums and projecting them at the opposite side, which engage and forces the dough into the lower portion of the feed-box and ultimately in the annular space between the clyinder 28 and die 29. For each revolution of the crank 41 the wire 50 makes a complete reciprocation across the lower end of the cylinder 28 and die 29 and cuts a doughnut therefrom. The thickness of the doughnut will depend on the relative rotation between the crank-arm and the drum. This can be changed by substituting gears of a different size for the gears 34 and 35.
When the machine is in operation it is shifted on the track until it stands directly over the vessel containing the cooking grease, so that as the doughnuts are severed they will drop into this vessel and will require no handling from the machine.
The precise embodiment of the invention is not material provided the essential characteristics are employed as pointed out in the annexed claims.

Having thus described our invention we claim as new and desire to secure by Letters Patent:
1. A doughnut cutter comprising means for feeding and forming dough or the like into doughnuts, a track from which the machine is suspended, and means for adjusting the inclination of the track.

2. A doughnut cutter comprising feeding means consisting of two coacting drums having paddles slidably mounted therein operable to force the material fed between the drums.

3. A doughnut cutter comprising a feeding-box, drums journaled therein, a die, and paddles slidably mounted in the drums for feeding the dough between the drums to the die.

4. A doughnut cutter comprising a feed-box, drums journaled therein with the sides of said box closely fitting and conforming to the peripheries of the drums for a portion of their length, a die, and slidable means carried by the drums for feeding dough or the like to the die.

5. A doughnut cutter comprising a feed-box, drums journaled therein, a die, paddles slidably mounted in the drums for feeding dough or the like between them to the die, and cams for pushing the paddles through the drums.

6. A doughnut cutter comprising a feed-box, drums journaled therein having intermeshing gears at the outer ends of their axes, a die, means for feeding dough or the like to the die, carried by said drums, means for driving said gears, a cam-plate also driven by said means, a shaft having arms fixed thereto operable from said plate, and a cutting device rigidly attached to said shaft and movable over said die.

7. A doughnut cutter comprising a feed-box, drums journaled therein, a die, and paddles having serrated ends slidably mounted in the drums for feeding dough or the like to the die.

8. A dough cutter comprising means for feeding and forming dough or the like into doughnuts, a crank operable at one side of the cutter to drive said means and track from which said means is suspended, and a handle fixed to said means at the opposite side of said cutter for shifting it on the track, whereby said crank and handle may be simultaneously grasped and worked by a single operator.

9. A doughnut cutter comprising means for feeding and forming dough or the like into doughnuts, a track from which said means is suspended, and a handle fixed to said means for shifting it on the track.

In testimony whereof we have signed our names to this specification in the presence of two subscribing witnesses.

ALBERT EMMET BAUM.
AUGUST SCHOEL.
CHARLES ED EDWARDS.

Witnesses:
 CHAS. W. STILSON,
 J. T. BURKETT.